US008361936B2

(12) United States Patent
Mukhopadhyay et al.

(10) Patent No.: US 8,361,936 B2
(45) Date of Patent: Jan. 29, 2013

(54) TREATMENT FLUID WITH NON-SYMMETRICAL PEROXIDE BREAKER AND METHOD

(75) Inventors: Sumitra Mukhopadhyay, Sugar Land, TX (US); Richard D. Hutchins, Sugar Land, TX (US); Marie Noelle Dessinges, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 468 days.

(21) Appl. No.: 11/863,638

(22) Filed: Sep. 28, 2007

(65) Prior Publication Data

US 2009/0088347 A1    Apr. 2, 2009

(51) Int. Cl.
*C09K 8/68* (2006.01)

(52) U.S. Cl. ........ 507/211; 507/203; 507/209; 507/219; 166/305.1

(58) Field of Classification Search .................. 507/203, 507/209, 211, 219; 166/305.1
See application file for complete search history.

(56) References Cited

U.S. PATENT DOCUMENTS

| | | | |
|---|---|---|---|
| 3,922,173 A | 11/1975 | Misak | |
| 4,552,675 A * | 11/1985 | Brown et al. | 507/211 |
| 4,695,389 A | 9/1987 | Kubala | |
| 4,725,372 A | 2/1988 | Teot | |
| 4,800,036 A | 1/1989 | Rose | |
| 4,919,209 A | 4/1990 | King | |
| 5,253,711 A | 10/1993 | Mondshine | |
| 5,447,199 A | 9/1995 | Dawson | |
| 5,551,516 A | 9/1996 | Norman | |
| 5,591,700 A * | 1/1997 | Harris et al. | 507/214 |
| 5,624,886 A | 4/1997 | Dawson | |
| 5,964,295 A | 10/1999 | Brown | |
| 5,979,557 A | 11/1999 | Card | |
| 6,258,859 B1 | 7/2001 | Dahayanake | |
| 6,306,800 B1 | 10/2001 | Samuel | |
| 6,412,561 B1 | 7/2002 | Brown | |
| 6,435,277 B1 | 8/2002 | Qu | |
| 6,506,710 B1 | 1/2003 | Hoey | |

(Continued)

FOREIGN PATENT DOCUMENTS

| | | |
|---|---|---|
| EA | 006323 B1 | 12/2005 |
| EP | 0 559 418 B1 | 2/1997 |

(Continued)

OTHER PUBLICATIONS

Jeremy Wessel, Robert H. Crabtree—Nonradical tetrabutylammonium monopersulfate oxidation of hydrocarbons catalyzed by [Mn3O4bipy4(H2O)2] (ClO4)4—Journal of Molecular Catalysis A: Chemical 113 (1996) 13-22, Department of Chemistry, Yale University, New Haven, CT 06520, U.S.A.

*Primary Examiner* — Alicia Toscano
(74) *Attorney, Agent, or Firm* — Jeremy Tillman; Daryl Wright; Robin Nava

(57) ABSTRACT

A treatment fluid composition for treating a subterranean formation penetrated by a wellbore is formed from an aqueous fluid, a hydratable polymer and a water-soluble, non-symmetrical, inorganic peroxide breaking agent, which is capable of undergoing heterolytical cleavage. A method of treating a subterranean formation penetrated by a wellbore may also be performed by forming a treatment fluid from an aqueous hydrated polymer solution. This is combined with a water-soluble, non-symmetrical, heterolytically cleavable inorganic peroxide breaking agent. The treating fluid is introduced into the formation. An optional crosslinking agent capable of crosslinking the polymer may also be included.

9 Claims, 4 Drawing Sheets

U.S. PATENT DOCUMENTS

| | | |
|---|---|---|
| 6,613,733 B1 | 9/2003 | Barnabas |
| 6,983,801 B2 | 1/2006 | Dawson |
| 7,036,590 B2 | 5/2006 | Harris |
| 2005/0227874 A1 | 10/2005 | Berger et al. |
| 2006/0025321 A1 | 2/2006 | Treybig |
| 2006/0166836 A1 | 7/2006 | Pena et al. |
| 2008/0202758 A1 | 8/2008 | Delorey |

FOREIGN PATENT DOCUMENTS

| | | |
|---|---|---|
| EP | 1743906 A2 | 1/2007 |
| RU | 2249097 C2 | 7/2003 |
| RU | 2338872 C2 | 6/2006 |

* cited by examiner

TREATMENT FLUID WITH NON-SYMMETRICAL PEROXIDE BREAKER AND METHOD

TECHNICAL FIELD

The present invention relates to treatment fluids for use in treating subterranean formations. In particular, the invention relates to viscosified treatment fluids and compositions and methods for breaking such fluids.

BACKGROUND

The statements in this section merely provide background information related to the present disclosure and may not constitute prior art.

Carbohydrate polymers, cross-linked with various ions, such as boron, zirconium, and titanium, are used as high-viscous fracturing fluids in the oil and gas industry. Polysaccharides, such as guar and guar derivatives, are commonly used as viscosifying water-based fluids for fracturing treatments and for proppant transport. The proppant remains in the produced fracture in order to keep the fracture open and create a conductive channel extending from the well bore into the formation along the fracture length. After the fracture is complete, the recovery of the fracturing fluid is crucial to accelerate hydrocarbon production through the formed channel.

The recovery of the fracturing fluid is achieved by reducing the viscosity of the fluid such that the fluid flows naturally through the proppant pack. Chemical reagents, such as oxidizers, acids and enzymes are typically employed to break the polymer networks to reduce their viscosity. These materials are commonly referred to as "breakers."

The timing of the breaking is important. Gels broken prematurely can cause proppant to settle out of the fluid before reaching a sufficient distance into the produced fracture and result in a premature screen-out. Premature breaking can also result in less desirable fracture width in the created fracture. On the other hand, too much delay in breaking the gel is not desirable either. Delayed breaking can cause significant setback in the hydrocarbon production. These factors, including reactivity levels versus temperature, delay mechanisms, and insufficient cleanup of the proppant pack impose significant complexity in designing a successful breaker system.

Ammonium persulfate or APS is one of the most widely used breakers in the industry. When ammonium persulfate is used, free sulfate radicals are generated due to thermal decomposition of the persulfate ions upon homolytic cleavage of the peroxo (O—O) bond. This free radical initiates a chain scission process by interacting with the polymer chain to abstract hydrogen, which results in the primary bond cleavage of either the mannose or galactose groups. The generated radicals propagate the process, further breaking the polymer into lower molecular weight fragments. This continues until the termination of the reaction occurs, mostly due to the combination of two radicals.

Although this process is very slow below 120° F. (50° C.), it becomes very rapid above this temperature, especially above 175° F. (80° C.). At such high temperatures, the ammonium persulfate breaker decomposes too quickly to be effective for use as a breaker in most applications.

Accordingly, a need exists for a breaker system that overcomes such limitations, and with higher control over a wide temperature range.

SUMMARY

A treatment fluid composition for treating a subterranean formation penetrated by a wellbore is formed from an aqueous fluid, a hydratable polymer and a water-soluble, non-symmetrical, inorganic peroxide breaking agent, which is capable of undergoing heterolytical cleavage. The composition may further include a crosslinking agent capable of crosslinking the hydratable polymer. In certain embodiments, the breaking agent may be selected from at least one of potassium, sodium or ammonium salts of peroxymonosulfate, tetra-n-butylammonium peroxymonosulfate.

A method of treating a subterranean formation penetrated by a wellbore is also provided wherein a treating fluid is formed from an aqueous hydrated polymer solution. A water-soluble, non-symmetrical, heterolytically cleavable inorganic peroxide breaking agent compound is included with the treating fluid. The treating fluid is introduced into the formation.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
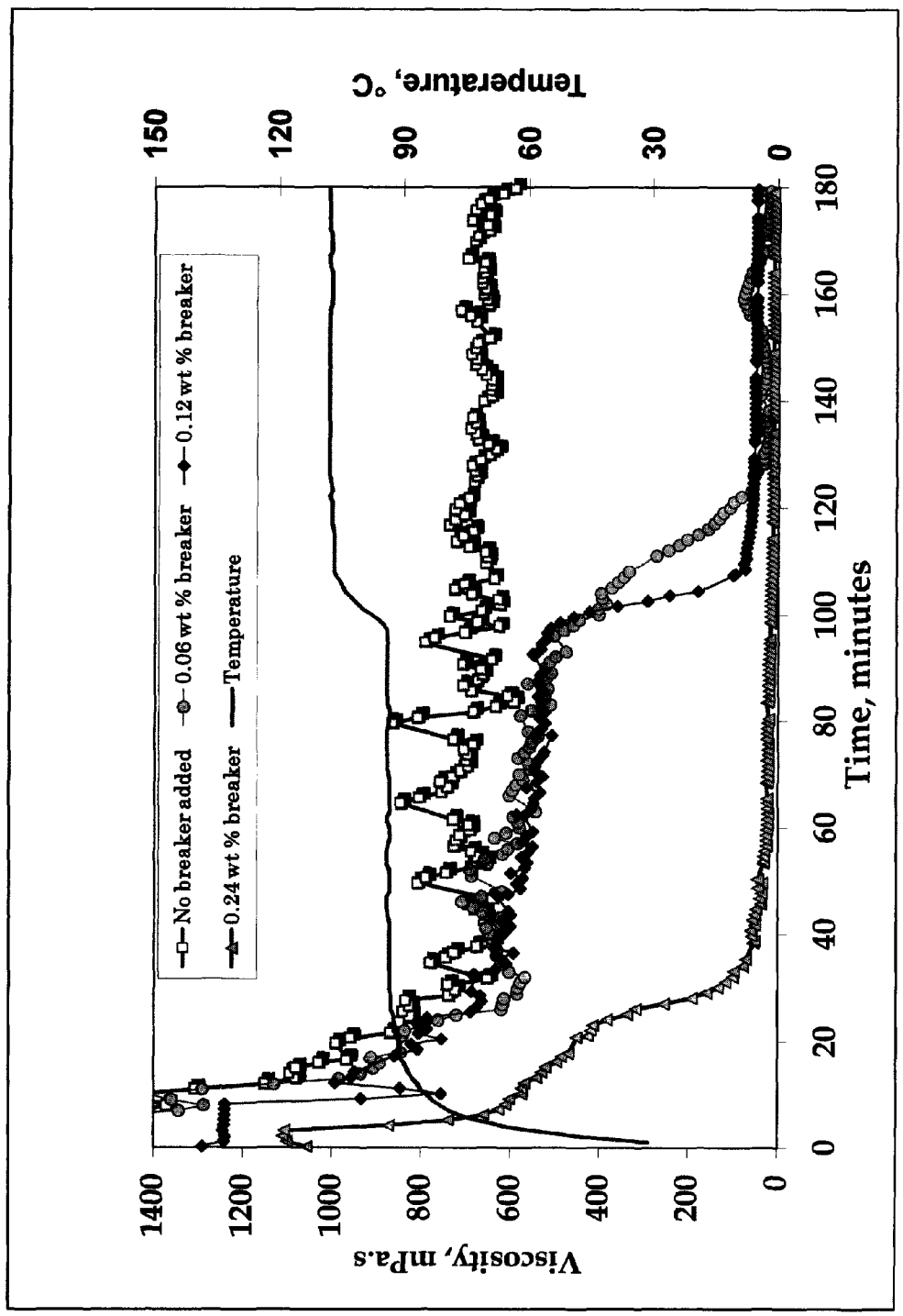
FIG. 1 shows a plot of the viscosity over time of gelled polymer solutions containing different amounts of ammonium persulfate breaker heated to approximately 125° F. (51.6° C.)

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The present invention is directed toward breaking fracturing fluids or viscosified fluids and in a controlled fashion using chemical oxidizers having a non-symmetrical O—O bond. The non-symmetrical O—O bond is capable of undergoing both hemolytic and heterolytic cleavage based on the reaction conditions. Homolytic cleavage results in two different radicals with presumably different half lives. In particular, the invention utilizes inorganic oxidizers with O—O bonds that are known to undergo heterolytical cleavage so that breaking of polymer networks occurs primarily through a non-free-radical pathway. Such chemical oxidizers may hereinafter be referred to as "non-symmetrical" breakers, breaking agents, oxidizers, oxidizing agents, etc. Inorganic oxidizers with non-symmetrical O—O bonds that are prone to heterolytical cleavage may be more stable and require higher temperatures to break the oxygen-oxygen bond due to the difference in the electronegativity of the adjacent atoms. This is contrasted with conventional breakers, such as ammonium persulfate, that are symmetrical and form similar radicals through homolytic cleavage. The conventional breakers are less stable and tend to activate at lower temperatures.

Certain inorganic peroxymonosulfate oxidizers are known for their strong oxidizing power as well as for their chemoselectivity properties, i.e., they are capable of oxidizing organic functional groups selectively. This has been attributed to the fact that they are less prone to follow radical reaction mechanisms. Being peracids rather than peroxides, these peroxymonosulfate compounds, with sulfate as the leaving group, readily undergo non-radical, heterolytic cleavage compared to peroxides, where hydroxide or alkoxide are expected to be less effective leaving group.

An example of a suitable heterolytically-cleavable peroxymonosulfate breaking agent is potassium peroxymonosulfate, also known as Caro's acid. Potassium peroxymonosulfate may exist as a stable triple salt ($2KHSO_5$—$KHSO_4$—$K_2SO_4$), which is commercially available from E.I. du Pont de Nemours and Company, in Wilmington, Del., and marketed under the trademark Oxone® as a pool oxidizer. Since the potassium peroxymonosulfate contains a non-symmetrical O—O bond, it is less likely to undergo homolytic cleavage to initiate a radical chain process. Thus it can act as an efficient single oxygen atom donor. Peroxyacids using other alkali metals besides potassium, such as sodium, may also be used. Ammonium salts may also be used.

In certain applications, cations larger than a single alkali metal, such as tetraalkylammonium salts of peroxymonosulfates are useful. The acidic pH of potassium peroxymonosulfate may not be suitable for it to be employed as a live breaker in some situations. For example, a high pH may be required to maintain a suitably high viscosity when employing borate crosslinked polymers, as well as some fluids incorporating zirconium crosslinking agents. Also, galactomannan polymers tend to be more stable at elevated pH, especially when subjected to temperatures exceeding 80° C. Encapsulation of the breaker or other delayed release mechanisms may resolve this problem. The need for higher pH, however, can also be met by using tetraalkylammonium salts, such as tetra-n-butylammonium peroxymonosulfate (OTBA), which is basic in solution. Other non-limiting examples of suitable tetraalkylammonium salts include tetra-n-pentylammonium peroxymonosulfate, tetra-n-hexylammonium peroxymonosulfate.

While non-symmetrical, inorganic oxidizing agents are preferred in the present invention, other non-symmetrical, organic oxidizing agents may also be used in certain embodiments. These may include peracids, for example, peracetic acid, or perbenzoic acid, and their derivatives. Certain alkyl hydroperoxides, such as methyl hydroperoxide, and not including tert-butyl hydroperoxide, may also be used in certain embodiments.

The breaking agent may initially be in a solid or liquid form. When in a solid form, the breaking agent may be crystalline or granular materials. The solid form may be encapsulated or provided with a coating to delay its release into the fluid. Encapsulating materials and methods of encapsulating breaking materials are known in the art. Such materials and methods may be used for the breaking agent of the present invention. Non-limiting examples of materials and methods that may be used for encapsulation are described, for instance, in U.S. Pat. Nos. 4,741,401; 4,919,209; 6,162,766 and 6,357,527, which are herein incorporated by reference. When used as a liquid the breaker salt is commonly dissolved in an aqueous solution. The non-symmetrical breakers are soluble in water, that is, they have a solubility of at least greater than 1 g in 100 g of water at room temperature, as measured using iodometric titration methods. Non-symmetrical breaker may have solubilities of 5 g, 10 g or more in 100 g of water.

The non-symmetrical oxidizing agent may also be used in the presence of metal catalysts. The metal catalysts accelerate the rate of reaction at a given temperature. Common classes of catalysts include metalloporphyrins, manganese, copper, iron, cobalt, nickel, silver, palladium and platinum.

In hydraulic fracturing of subterranean formations the fracturing fluids, which are typically aqueous fluids, may be viscosified or gelled so that they have sufficient viscosities to carry or suspend proppant materials, prevent fluid leak off, etc. In order to provide higher viscosity to the aqueous fracturing fluids, water soluble or hydratable polymers are often added to the fluid. These hydratable polymers are typically crosslinked using crosslinking agents to provide a gelled polymer network that increases the viscosity of the fluid to a desired fluid viscosity, although some fracturing fluids contain only the linear polymer without crosslinker added. In other cases, associative viscosification is achieved with suitable polymers and surfactant mixtures.

The non-symmetrical breaking agent may be used in conjunction with such hydratable polymers, which may be linear or crosslinked. As discussed earlier, conventional ammonium persulfate breakers decompose too quickly to be effective for use as a breaker for such polymer fluids in most applications above about 125° F. (~50° C.). The non-symmetrical breakers may be used in breaking such viscosified fluids in environments of from about 125° F. (~50° C.) and higher, more particularly from about 125° F. (~50° C.) to about 250° F. (121° C.). Because the non-symmetrical O—O bond of the breakers of the invention are more stable, higher temperatures are required to break the bond within a given time.

It should be understood that throughout this specification, when a concentration or amount range is described as being useful, or suitable, or the like, it is intended that any and every concentration or amount within the range, including the end points, is to be considered as having been stated. Further-more, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor appreciate and understand that any and all data points within the range are to be considered to have been specified, and that the inventors have possession of the entire range and all points within the range.

The hydratable polymers useful in the present invention may include any hydratable polymers familiar to those in the well service industry that are water soluble. Examples of suitable hydratable polymers include, but are not necessarily limited to, guar gums, high-molecular weight polysaccharides composed of mannose and galactose sugars, or guar derivatives such as hydropropyl guar (HPG), carboxymethyl guar (CMG), and carboxymethylhydroxypropyl guar (CM-HPG), galactomannan gums, glucomannan gums, guars, derived guars and cellulose derivatives. Cellulose derivatives such as hydroxyethylcellulose (HEC), carboxymethylcellulose (CMC), hydroxypropylcellulose (HPC) and carboxymethylhydroxyethylcellulose (CMHEC) may also be used. Also, synthetic polymers containing acrylamide are useful, including polyacrylamides, partially hydrolyzed polyacrylamides, copolymers of acrylamide and acrylic acid and copolymers and terpolymers containing acrylamide, vinyl pyrollidone, AMPS (2-Acrylamido-2-Methyl Propane Sulfonic Acid, or acrylic acid. The viscosifying agent may be heteropolysaccharide viscosifying agent. Heteropolysaccharides such as xanthan gum and those disclosed in U.S. Patent Publication No. US2006/0166836, published Jul. 27, 2006, which is herein incorporated by reference, may be used. The heteropolysaccharide may include those having a tetrasaccharide repeating unit in the polymer backbone as represented by the chemical formula (1):

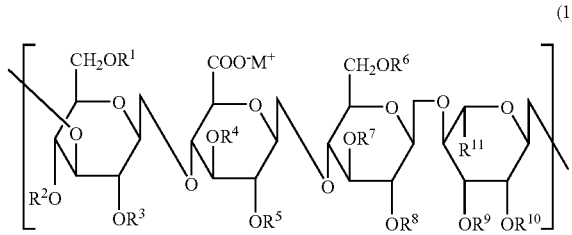

(1)

wherein at least three different saccharides are present in the repeating unit, such saccharides including D-glucose, D-glucuronic acid, and either L-rhamnose or L-mannose; $M^+$ is an ionic species; $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$.

The hydratable polymer may be added in various concentrations to provide the desired viscosity. Concentrations of up to about 1% by weight of total weight of the treatment composition may be used. In certain embodiments of the invention the hydratable polymer may be used in an amount of from about 0.05% to about 0.5% by total weight of the composition.

The polymers may be capable of being crosslinked with any suitable crosslinking agent, such as metal ion crosslinking agents. Examples of such materials include the polyvalent metal ions of boron, aluminum, antimony, zirconium, titanium, etc., that react with the polymers to form a composition with adequate and targeted viscosity properties for particular operations. The crosslinking agent may be added in an amount that results in suitable viscosity and stability of the gel at the temperature of use. Typically, crosslinkers are added at concentrations of about 5 to about 500 parts per million (ppm) of active atomic weight. That concentration can be adjusted based on the polymer concentration. The crosslinker is preferably added as a solution and may include a ligand which delays the crosslinking reaction. This delay may be beneficial in that the high viscosity fracturing fluid is not formed until near the bottom of the wellbore to minimize frictional pressure losses and may prevent irreversible shear degradation of the gel, such as when Zr or Ti crosslinking agents are used. Delayed crosslinking may be time, temperature or both time and temperature controlled and is critical to the successful fracturing process.

When incorporated, the polymer based viscosifier may have any suitable viscosity. The minimum viscosity may be that that is suitable to carry proppant within the fracturing environment. In certain embodiments, the viscosity may be from about 50 mPa-s or greater at a shear rate of about 100 $s^{-1}$ at treatment temperature, more particularly about 75 mPa-s or greater at a shear rate of about 100 $s^{-1}$, and even more particularly about 100 mPa-s or greater. Generally, the maximum viscosity is less than about 1000 mPa-s, more typically, less than about 600 mpa-s at a shear rate of about 100 $s^{-1}$. Higher viscosities are generally avoided to minimize the cost and promote better clean-up of the fracturing fluid after the fracture has closed and the well is in the production phase.

The non-symmetrical breaking agent may be used in an amount of from greater than 0% to about 1.5% or more by weight of the treatment fluid, more particularly, from about 0.002% to about 0.5% by weight of the treatment fluid. These materials may be used as solids, which are soluble in water, or may be used in liquid form. The breaking agent, and optionally, the metal catalyst, may be used in dry form or slurried and added to the aqueous fluid at the surface, with or without the hydratable polymer already added. Alternatively, the breaker and/or any metal catalyst may be contained in a suspension. The catalyst may also be encapsulated. This may be useful when the non-symmetrical breaker is only effective at the temperature of use with the presence of a catalyst. By encapsulating the catalyst, the activation of the breaker can be delayed until the catalyst is released.

The breaking agent may be suspended in a non-aqueous or immiscible medium, for example, diesel, mineral oil, etc., prior to mixing with the aqueous fluid and injection into the formation. The suspension may further include a suspension aid, such as hydroxyl propyl cellulose in a glycol ether solvent, such as polyethylene glycol. The suspension may delay reaction of the breaking agent with the polymer solution. The breaking agent may also be added on the fly as liquid or pre-mixed in water.

As discussed earlier, in certain applications, the breaking agent may be encapsulated within an encapsulating material to delay reaction with the gelled polymer fluid. Encapsulating materials may include poly n-vinylidene chloride or materials and polymers that are slightly soluble or insoluble in the treatment fluid.

A breaking delay agent may also be added to the treatment fluid to inhibit or delay reaction of the breaker. Examples of suitable breaking delay agents may include sodium nitrite ($NaNO_2$), NaNO, sodium thiosulfate ($Na_2S_2O_3$), triethanol amine and urea. These may be added in an amount of from about 0.02% to about 0.05% by weight of treatment fluid. Delaying agents are particularly useful at higher temperatures, such as at 60° C. or more, where reactions may be accelerated due to the higher temperatures. The breaking delay agent may be encapsulated. Moreover, the breaking delay agent may be encapsulated together with the breaking agent. Alternatively, the breaking delay agent may be delivered separately from the breaking agent.

The gelled polymer solutions, linear or crosslinked, foamed or unfoamed, are particularly useful as carrier fluids for proppants. The proppants may be those that are substantially insoluble in the polymer solution and/or fluids of the formation. In fracturing operations, proppant particles carried by the treatment composition remain in the fracture created, thus propping open the fracture when the fracturing pressure is released and the well is put into production. The proppants may have a particle size of from about 0.15 mm to about 2.5 mm. Suitable proppant materials include, but are not limited to, sand, walnut shells, sintered bauxite, glass beads, ceramic materials, naturally occurring materials, or similar materials. Mixtures of proppants can be used as well. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc.

The concentration of proppant in the composition may be any concentration that is suitable for carrying out the particular treatment desired. For example, the proppant may be used in an amount up to about 3 kilograms of proppant added per liter of the composition. Also, any of the proppant particles may be coated with a resin to potentially improve the strength, clustering ability, and flow back properties of the proppant.

A fiber component may be included in compositions of the invention to achieve a variety of properties including improving particle suspension, and particle transport capabilities, and foam stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like. When used in compositions of the invention, the fiber component may be included at concentrations from about 1 to about 15 grams per liter of the composition, more particularly the concentration of fibers may be from about 2 to about 12 grams per liter of composition, and more particularly from about 2 to about 10 grams per liter of composition.

Other additives may also be added to the treatment fluid that are known to be commonly used in oilfield applications by those skilled in the art. These may include clay stabilizers, surfactants, high temperature fluid stabilizers, oxygen scavengers, alcohols, scale inhibitors, corrosion inhibitors, fluid-loss additives, bactericides, foaming agents, clean up surfactants, wetting agents, friction pressure reducers, and the like.

Compositions according to the invention may be foamed and energized well treatment fluids which contain "foamers," which may include surfactants or blends of surfactants that facilitate the dispersion of a gas into the composition to form small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called a foam fluid, and below 52%, an energized fluid. Hence, compositions of the invention may include ingredients that form foams or energized fluids, such as, but not necessarily limited to, foaming surfactant, or blends of surfactants, and a gas or super-critical fluid which effectively forms a foam or energized fluid. Suitable examples of such gases include carbon dioxide, nitrogen, or any mixture thereof.

In most cases, the fluids of the invention are used in hydraulic fracturing treatments. Hydraulic fracturing consists of pumping a proppant-free composition, or pad, into a well faster than the composition can escape into the formation so that the pressure rises and the rock breaks, creating artificial fractures and/or enlarging existing fractures. Then, proppant particles, such as those previously discussed, are added to the composition to form a slurry that is pumped into the fracture to prevent it from closing when the pumping is ceased and fracturing pressure declines. The proppant suspension and transport ability of the treatment base composition traditionally depends on the viscosity of the fluid. Techniques for hydraulically fracturing a subterranean formation are known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein.

In the fracturing treatment, compositions of the present invention may be used in the pad treatment, the proppant stage, or both. The components are mixed on the surface. Alternatively, the composition may be prepared on the surface and pumped down tubing while a gas component, such as carbon dioxide or nitrogen, could be pumped down the annulus to mix down hole, or vice versa, to form a foam or energized fluid composition.

In another embodiment, the compositions may be used for gravel packing a wellbore. As a gravel packing composition, it may contain gravel or sand and other optional additives such as filter cake clean up reagents such as chelating agents or acids (e.g. hydrochloric, hydrofluoric, formic, acetic, citric acid) corrosion inhibitors, scale inhibitors, biocides, leak-off control agents, among others. For this application, suitable gravel or sand is used typically having a mesh size between 0.2 mm (~70 mesh) and 2.4 mm (~8 mesh).

The following examples serve to further illustrate the invention.

EXAMPLES

Potassium peroxymonosulfate, available as Oxone®, and tetra-n-butylammonium peroxymonosulfate or OTBA were tested as breakers for guar polymer crosslinked with boric acid. The activation temperature for Oxone® to degrade cross-linked guar is above 150° F. (65.6° C.), as evident from water bath tests and rheology data. Rheology tests have shown that OTBA is active above 175° F. (79.4° C.) and acts best at 200° F. (93.3° C.).

Examples 1 through 4 employed a 25 lb base solution (i.e. 25 lb gel/1000 gal or 3 kg gel/1000 L) prepared by hydrating 3.0 gm of guar gum in 1.0 liter deionized (DI) water, using a blender for 20 minutes. Next, 2 mL of a 50% by weight aqueous solution of tetramethylammonium chloride was added as a clay stabilizer. The linear fluid was then crosslinked by adding an amount of crosslinker containing 0.38 gm of boric acid and 0.76 gm of sodium gluconate, followed by slow addition of a 30 wt % solution of sodium hydroxide to raise the pH to about 11.

In Example 5, a 40 lb base solution (i.e. 40 lb gel/1000 gal or 4.8 kg gel/1000 L) was prepared by hydrating 4.8 gm of guar gum in 1.0 liter DI water using a blender for 20 minutes in which 0.2% by volume of a 50% by weight aqueous solution of tetramethylammonium chloride was added as a clay stabilizer. The linear fluid was then crosslinked by adding an amount of crosslinker containing 0.57 gm of boric acid and 1.14 gm of sodium gluconate, followed by slow addition of a 30 wt % solution of sodium hydroxide to raise the pH to about 11.5.

To compare the breaking efficiency, 50 mL samples of the crosslinked fluids were heated to a specific temperature in a water bath. Various breakers were then added to each sample. After shaking the sample to mix the contents, the fluids were placed back in the water bath at the specified temperature. They were visually checked for breaking at 30 minute intervals. A blank sample, in which no breaker was added, was also placed in the bath for comparison.

Rheology was measured using a Grace M5500 viscometer, available from Grace Instrument Co. using a number 1 rotor and a number 5 bob. This model 50 viscometer conforms to the specification in standard ISO 13503-1, Measurement of viscous properties of completion fluids. The viscosities are reported at a shear rate of 100 s$^{-1}$.

Example 1

Tests were conducted using ammonium persulfate and potassium peroxymonosulfate, available as Oxone®, Water bath tests performed at 125° F. (51.6° C.) for 1.5 hours exhibited that 0.12 wt % of ammonium persulfate broke the fluid completely at this temperature, whereas, the fluid that contained 0.12 wt % Oxone®, did not degrade and remained highly viscous Example 2

Comparative

As a comparison, rheological studies were conducted using the crosslinked guar solution without a breaker and with an ammonium persulfate breaker at different concentrations of 0.012%, 0.024% and 0.06% by weight. As can be seen in FIG. 1, the ammonium persulfate was capable of oxidizing the fluid and reducing the viscosity at about 125° F. (51.6° C.).

Example 3

Figure 2:
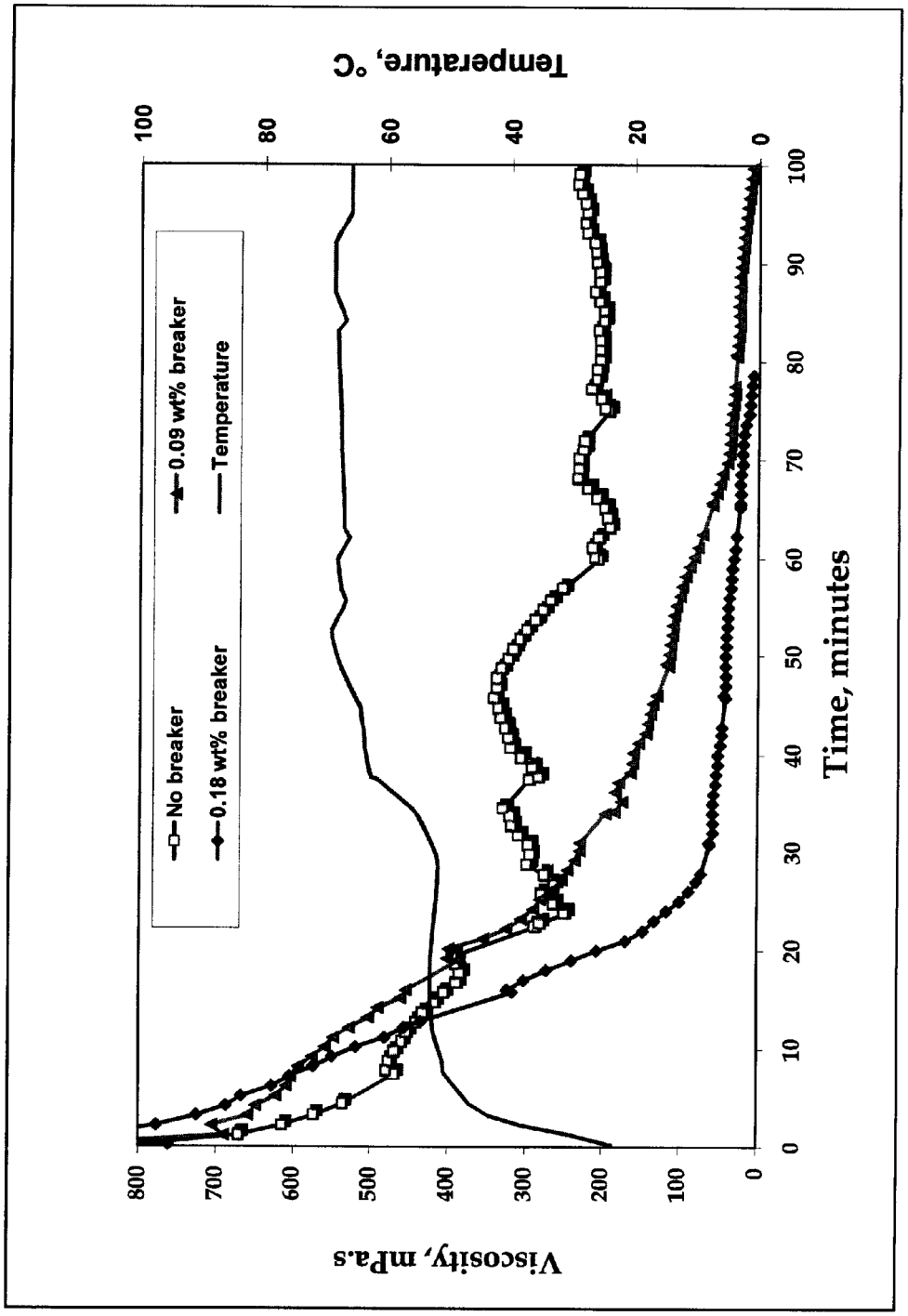
FIG. 2 shows a plot of the viscosity over time of gelled polymer solutions containing different amounts of potassium peroxymonosulfate heated to approximately 150° F. (65.6° C.)

Rheology studies were conducted on the crosslinked guar solutions using no breaker and using potassium peroxymonosulfate, available as Oxone®, at different concentrations of 0.09% and 0.18% by weight As can be seen in FIG. 2, the Oxone® at both concentrations was capable of oxidizing the fluid at about 150° F. (56.6° C.).

Example 4

Figure 3:
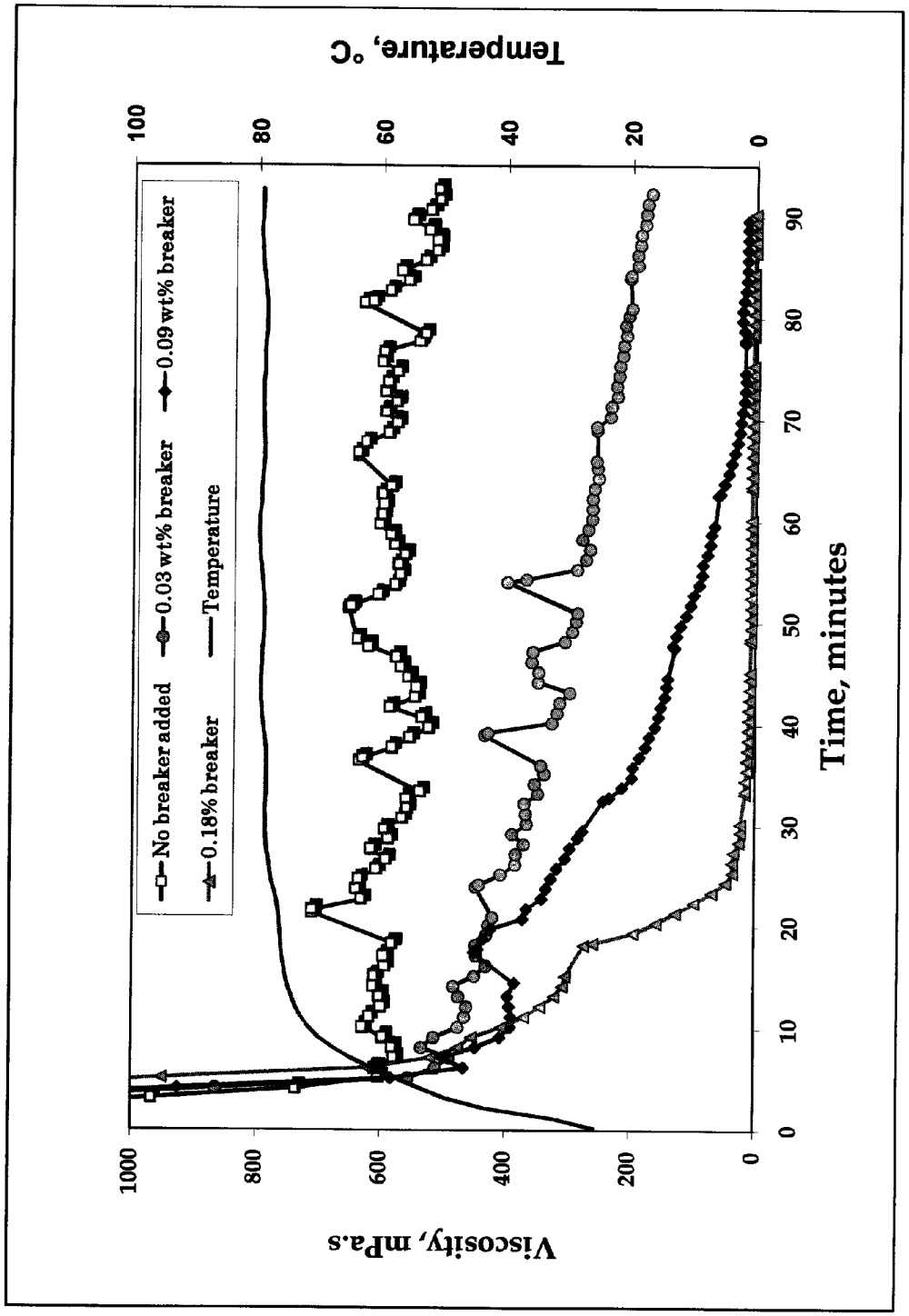
FIG. 3 shows a plot of the viscosity over time of gelled polymer solutions containing different amounts of tetra-n-butylammonium peroxymonosulfate heated to approximately 175° F. (79.4° C.)

Rheology studies were conducted on the crosslinked solutions using no breaker and using tetra-n-butylammonium peroxymonosulfate (OTBA) at different concentrations of 0.03%, 0.09% and 0.18% by weight. As can be seen in FIG. 3, the OTBA at both concentrations was capable of oxidizing the fluid at about 175° F. (79.4° C.).

Example 5

Figure 4:
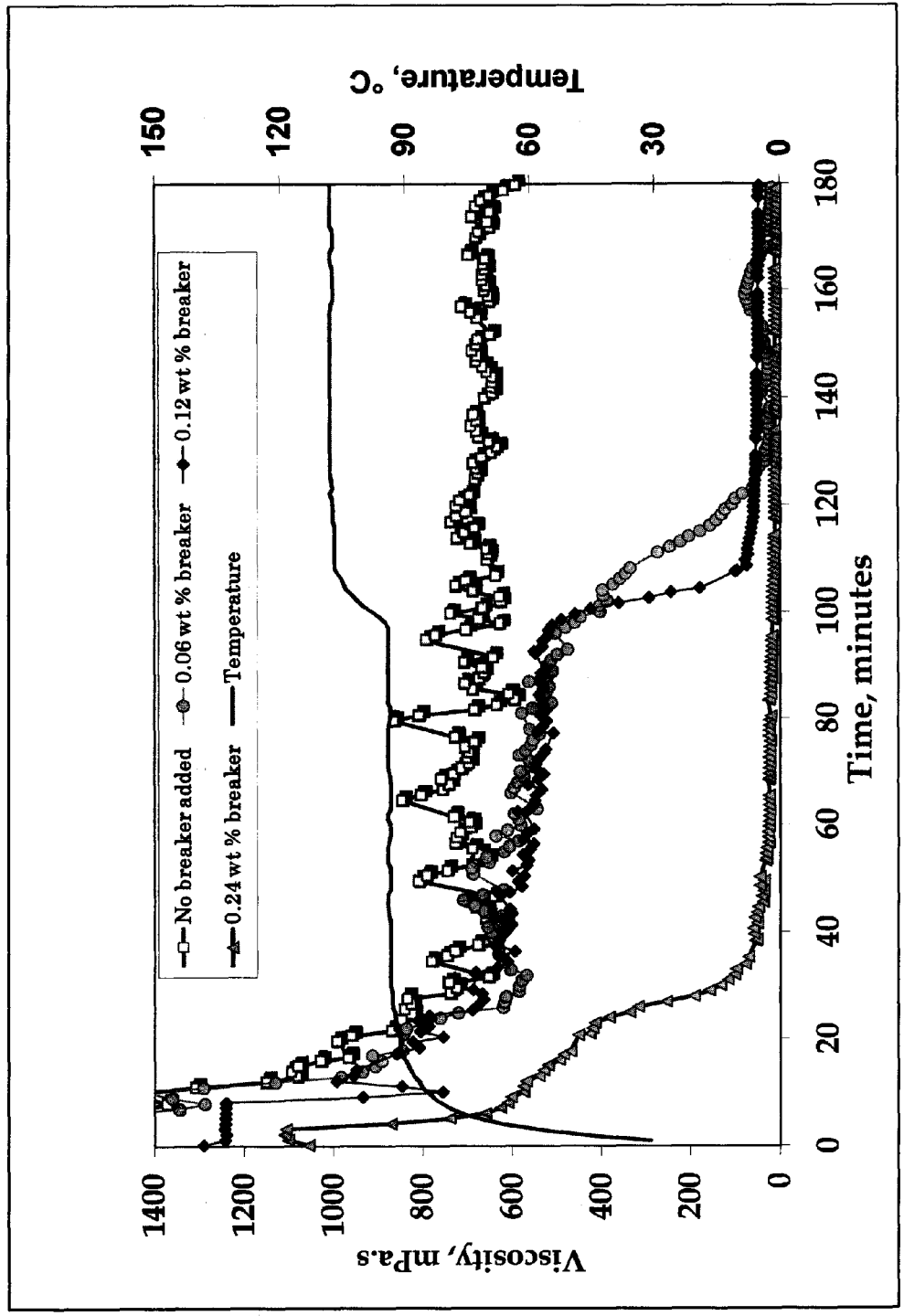
FIG. 4 shows a plot of the viscosity over time of gelled polymer solutions containing different amounts of tetra-n-butylammonium peroxymonosulfate heated to approximately 225° F. (107.2° C.).

Rheology studies were conducted on the crosslinked solutions using no breaker and using tetra-n-butylammonium peroxymonosulfate (OTBA) at different concentrations of 0.06%, 0.12% and 0.24% by weight. The solutions were heated to a temperature of about 225° F. (107.2° C.). The results are shown in FIG. 4.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
    forming a treatment fluid from an aqueous hydrated polymer solution;
    combining a water-soluble, non-symmetrical, heterolytically cleavable inorganic peroxide breaking agent with the treatment fluid;
    introducing the combined fluid into the formation,
    heterolytically cleaving at least a portion of the peroxide breaking agent; and
    applying the heterolytically cleaved peroxide agent to reduce the viscosity of the polymer in the aqueous hydrated polymer solution,
    wherein the peroxide breaking agent is tetra-n-alkylammonium peroxymonosulfate.

2. The method of claim 1, wherein: the treatment fluid is formed from an aqueous crosslinkable hydrated polymer solution and a crosslinking agent capable of crosslinking the polymer.

3. The method of claim 1, further comprising: combining a metal catalyst with the treatment fluid.

4. The method of claim 1, wherein: the polymer is selected from the group consisting of polysaccharides, galactomannans, guar, guar gums, guar derivatives, cellulose and cellulose derivatives, polyacrylamides, partially hydrolyzed polyacrylamides, copolymers of acrylamide and acrylic acid, terpolymers containing acrylamide, vinyl pyrollidone, 2-acrylamido-2-methyl propane sulfonic acid and heteropolysaccharides having a tetrasaccharide repeating unit in the polymer backbone as represented by the chemical formula:

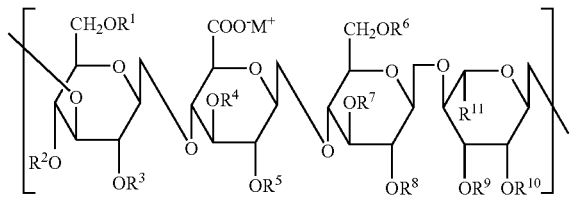

wherein at least three different saccharides are present in the repeating unit, such saccharides including D-glucose, D-glucuronic acid, and either L-rhamnose or L-mannose; $M^+$ is an ionic species; $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$.

5. The method of claim 1, wherein the introducing of the treatment fluid into the formation comprises injecting the treatment fluid into a portion of the formation having a temperature of from about 50° C. to about 125° C.

6. The method of claim 1, wherein: the treatment fluid is introduced at a pressure above the fracture pressure of the formation.

7. The method of claim 1, wherein: the peroxide breaking agent is combined with the treatment fluid in an amount of from greater than 0% to about 1.5% by weight of the treatment fluid.

8. The method of claim 1, wherein: the peroxide breaking agent is at least one of encapsulated or contained within a suspension.

9. The method of claim 8, further comprising: combining a breaking delay agent with the treatment fluid.

* * * * *